United States Patent
Holladay

[11] 3,837,703
[45] Sept. 24, 1974

[54] GLARE SHIELDS

[76] Inventor: Forrest E. Holladay, 14314 Shadywood Dr., Plymouth, Mich. 48170

[22] Filed: Oct. 26, 1971

[21] Appl. No.: 192,603

Related U.S. Application Data

[63] Continuation of Ser. No. 19,747, March 16, 1970, abandoned.

[52] U.S. Cl. ............................................. 296/97 C
[51] Int. Cl. ............................................. B60j 3/02
[58] Field of Search ................................. 296/97 C

[56] References Cited
UNITED STATES PATENTS

| 2,542,409 | 2/1951 | Guenther | 296/97 C |
| 2,793,072 | 5/1957 | Lowe | 296/97 C |
| 2,820,669 | 1/1958 | Lowe | 296/97 C |
| 3,246,925 | 4/1966 | Calabrese | 296/97 C |
| 3,304,118 | 2/1967 | Jonas | 296/97 C |

Primary Examiner—David Schonberg
Assistant Examiner—John A. Pekar
Attorney, Agent, or Firm—Russel C. Wells; Wallace P. Lamb

[57] ABSTRACT

A glare shield assembly for mounting on a sun visor of a motor vehicle. A light-filtering shield is mounted in offset relationship to and on a pair of spaced pivots attached to and below the lower edge of the sun visor. The offset pivot makes it possible to position the shield as a lower extension of the visor either by pivoting the shield forwardly of the visor or rearwardly of the visor. Further, the pivot is located closer to one of the horizontal edges of the sheild than to the opposite horizontal edge of the shield so that in one of its positions more of the shield projects below the visor than in the other of its positions. In addition, an area of the shield has different filtering characteristics on one side of its pivot than on the other side of its pivot for selectively to overcome different glare conditions.

9 Claims, 7 Drawing Figures

PATENTED SEP 24 1974  3,837,703
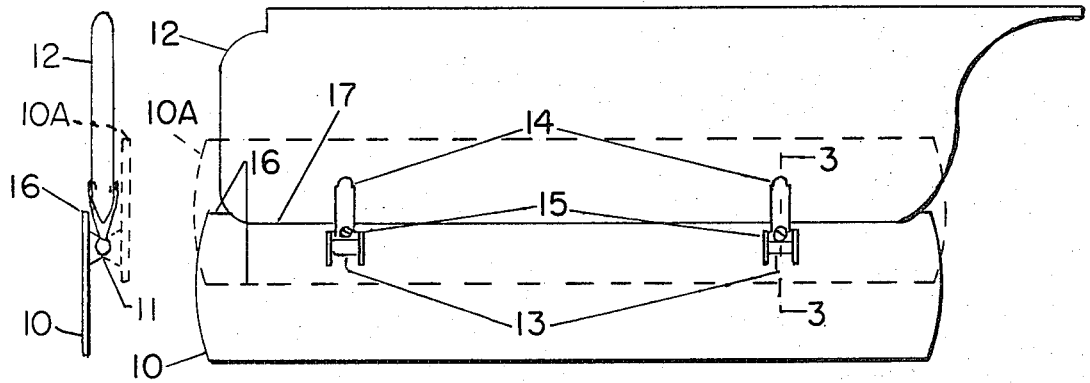
Fig. 1    Fig. 2
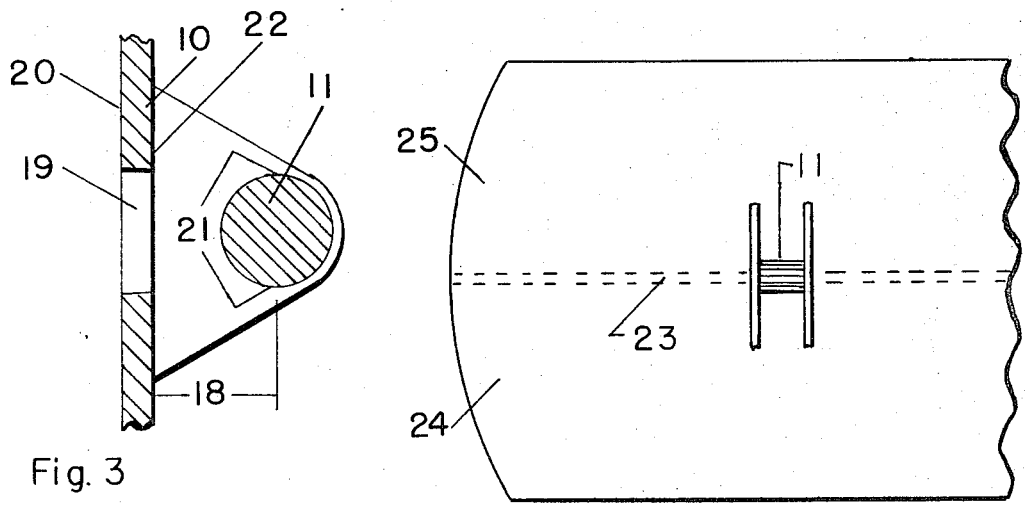
Fig. 3    Fig. 4
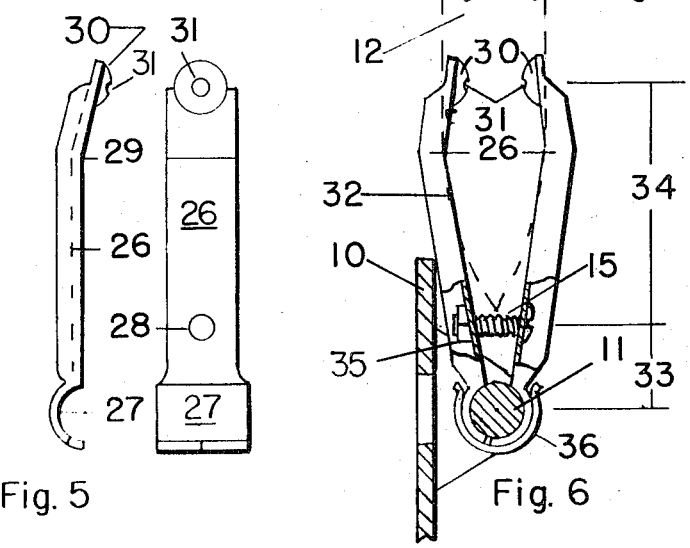    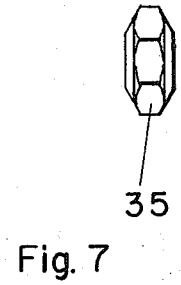
Fig. 5    Fig. 6    Fig. 7

GLARE SHIELDS

This is a continuation, of application Ser. No. 19,747, filed Mar. 16, 1970, now abandoned.

This invention relates to the construction of a light filtering devices such as that commonly used on motor vehicles, boats and airplanes and the like. More specifically, it relates to such devices and the means by which they may be attached to opaque sun visors with which such vehicles usually come equipped, providing a light filtering area commonly referred to as a "glare shield."

Usually, such devices fold up against the sun visor. In such position it is necessary to meove the opaque sun visor from the car ceiling down to it's use position and then move the light filtering attachment to it's operating position. Obviously, under emergency need such as driving over a hillcrest into the sun or sudden bright lights, such adjustment activity will distract the drivers attention or, in case he is unable to carry out the required manipulations, leaves said driver without the protection intended to be provided by the glare shield.

The primary purpose of my invention is to provide a light filter and means of atachment so constructed that when the major light filtering surface is folded up against the opaque sun visor, a minor light filtering surface will be extended in use position; thus the simple movement of the opaque sun visor to it's use position always provides a sufficient light filtering area to meet emergencies. Another purpose is to provide a novel type of offset pivot which, in conjunction with a pair of non-offset mounting brackets, allows a single light filtering element to fold smoothly to opposite sides of the opaque sun visor, thus providing two different projection lengths from a single pair of pivots and a single light filtering element. Another form of this construction also anticipates providing a light filtering element of compound construction in a single sheet probably with, but not limited to, equal extensions which have differing degrees of light filtering to provide less filtering for night driving as compared to darker filtering required to control bright sun glare. Another purpose of this invention is to provide a pair of clamping devices, each of two pairs mounting with a single screw, that will attach firmly with clamping action only to either hard surface of padded sun visors without abraiding or breaking the surface there-of, presenting rounding surfaces only to the visor surface materials and providing adjustable clamping forc to stablize the attachment at the pivots.

These, together with other objectives and advantages which will become subsequently apparent, reside in the details of construction and operation as here-in-after more fully described and claimed, reference being had to the accompanying drawings forming a part hereof, where-in like numerals refer to like parts and in which:

FIG. 1 is an end view of a conventional opaque sun visor and my glare shield mounted thereon;

FIG. 2 is a rear view;

FIG. 3 is a cross sectional view, taken substantially along the line 3—3 of FIG. 2;

FIG. 4 is an enlarged fragmentary view of a modified glare shield;

FIG. 5 are elevational view of one of two like clamp parts;

FIG. 6 is a vertical sectional view of the glare shield and one of the mounting clamps in elevation, and FIG. 7 is a side view of a nut of the clamp assembly.

To mount the shield 10 on the visor 12, the lower edge of the visor is engaged between the clamp arms of each pair of clamps and the shield 10 is moved upward to the desired position. The screw 15 is then rotated to engage the gripping points 14 against opposite sides of the visor and at the same time clamp the arms at 27 to the pivot pins 11. The solid outline of the glare shield 10 shows the shield in maximum extended position which, for convenience but not restrictive, should clear the drivers hand at the top of the steering wheel when the glare shield is moved from the car ceiling to the windshield and from the windshield to the side window or the reverse of these movements. It will also be noted that with proper positioning of the pivots 11 on the surface of 10, the top edge of the glare shield 16 will overlap the bottom edge of the visor 12 as designated by 17, thus closing the strip usually left open to glare between the visor 12 and the glare shield 10. The device as shown is 4 × 20 inches with pivots 1 inch from the top edge 16 which provides 3½ inches extension in the maximum extended position. The dotted lines as shown by 10A illustrate the glare shield reversed on its pivots to the opposite side of the visor 12 and reverses edge 16 of the glare shield from top to bottom position and the glare shield in this minimum extended position entends 1½ inches below the bottom 17 of the visor 12. Thus, the axis of the pivot 11 extends between the opposite, substantially horizontal edges of the glare shield 10, the axis being closer to one of said edges than to the other so as to provide two different length glare shield legs, selectively positionable in glare shield position. FIG. 3 shows a novel type of offset pivot as illustrated by cylindrical cross section 11 which is offset from surface 22 of filter 10 by the distance 18 which is one-half the estimated maximum thickness of the padded visors to which it is intended to be attached as represented by 12. The opening 19 in the face of the filter 10 is approximately the same dimensions (actually slightly larger) as the diameter and length of the cylindrical pivot and allows an extension from the mold surface which forms the filter surface 20 to project through said opening to form half of the cylindrical pivot 11 as shown by the inclusive lines 21. Said offset pivot may be fabricated in several other ways but at greater cost in assembly and-/or molding dies. The primary novelty of this pivot is it's offset position relative to the plane 22 of the filter 10. These pivots, usually two in number, may be positioned anywhere on the plane 22 or at its periphery as may be required by varying objectives desired. As shown, the shield 10 overlies the axis in lateral broadside spaced relation.

FIG. 4 shows another form of my invention in which a filter shield similar to 10, is divided as at 23 with areas 24 and 25 being of different light filtering intensities, as may be determined to be desirable for variable conditions such as night driving as compared to bright sun glare, but are joined in a single shield as distinguished from prior art which provided two separate filters, each of said filters being separately maneuverable.

FIG. 5 shows a single novel clamp member. Two of these clamp members self-mate to form a clamp as shown in FIG. 6. The clamp member 26 provides a bearing surface 27 to mate with pivot 11. A clamping screw hole 28 is spaced as described later. An angular or radiused bend is provided at 29 which contour fits to padded visor 12 as shown in FIG. 6 by dotted lines 32. 30 is a spherical gripping point for padded or solid surfaces. The hole 31 improves the gripping ability of the spherical gripping point; this point could be a cylindrical center section with spherical ends.

FIG. 6 shows the assembled clamp in position as shown in FIGS. 1 and 2 and is intended to illustrate the clamps gripping the padded visor 12 when mounted on the pivot 11. It will be noted that the spherical gripping points 30 are securely embedded in the padded visor 12 and that the holes 31 provide engagement with the visor material, further enhancing the holding ability of the clamp. The angular or radiused tips at 29 provide clearance with the radiused edge of the visor 12, as at 32, the dotted lines allowing the spherical tips 30 to embed in the padded visor. Screw 15 together with the conical nut shown in FIG. 7 provides clamping force which is distributed between the clamp tips 30 and the pivot 11 in proportion to the leverage distances 33 and 34. A ratio where 33 is equal to 1 and 34 is equal 3 has been found to be satisfactory and allows reasonable variation in adjusting the pivot friction without making the grip on the visor 12 insecure. A resilient spring cover 36 is provided and snaps into place over the lower end of the clamp. The visor between the gripping points 30 of the clamp is a resilient member for allowing the bearing surfaces 27 to normally and yieldably hold an out-of-round pivot 11 without subsequent adjustment of the screw 15.

FIG. 7 shows a nut with cone shaped surfaces — these surfaces could serve their function as well with radiused or spherical forms. Such relief allows the nut to clear the clamp member 26 at the nut's periphery, seating on the edge of the hole 28 in the clamp member 26 thus eliminating the side leverage which would result if such clearance were not provided.

Having described my invention, what I claim as new and desire to seucred by letters patent, is:

1. A glare shield device for an operator of a motor vehicle comprising:
   visor means mountable behind the windshield of a motor vehicle and having opposite sides and a lower end portion,
   clamping means for gripping on said opposite sides of said lower end portion of said visor means and extending beyond said lower end portion,
   pivot means supported and frictionally gripped by said clamping means beyond said lower end portion, said clamping means normally and yieldably holding said pivot means against rotation, and
   a glare shield having a broadside surface, said shield affixed on said broadside thereof to said pivot means in spaced relationship thereto, for selective positioning on either side of said lower end portion.

2. A glare shield device for mounting on a visor by an operator of a motor vehicle comprising:
   a substantially flat transparent member having two spaced broadside surfaces defined by two spaced apart elongated edges,
   at least one cylindrical pivoting member mounted on and spaced from one of said broadside surfaces of said transparent member, said pivot member having its elongated axis substantially parallel to one of said elongated edges of said transparent member,
   a pair of elongated opposed clamping members, each having one end having a cylindrical concave bearing surface for overlying and bearing on a portion of the cylindrical surface of said pivot member and the other end of each of said elongated clamping members having a smooth raised gripping surface with an aperture centrally located therein, and
   a toggle link interconnecting said clamping members at a point intermediate its ends, said link securing said concave bearing surfaces in a clamping relationship around said pivot member and said opposed raised gripping surfaces in a pinching relationship on opposite sides of the visor of the vehicle.

3. A glare shield device as defined by claim 2 wherein the distance from the axis of said pivot member to one elongated edge of said transparent member is greater than the distance from said axis to the other elongated edge of said transparent member.

4. A glare shield device as defined by claim 2 wherein said transparent member is a filter to the rays of sunlight.

5. A glare shield device as defined by claim 2 additionally including a second cylindrical pivot member, a second pair of elongated clamping members and a second toggle link, said second pivot member having its axis substantially in line with said first cylindrical pivot member and spaced therefrom in the direction of said elongated edge.

6. A glare shield device as defined by claim 2 wherein said raised gripping surface of said elongated clamping member has a cylindrical shape with an elongated aperture transverse to the direction of length of said elongated clamping member.

7. A glare shield device as defined by claim 2 wherein said toggle link is a threaded member mounted for controlling the clamping forces between opposed cylindrical surfaces of said clamping members.

8. A glare shield device as defined by claim 2 wherein said toggle link is positioned closer to said concave bearing surfaces then said convex gripping surfaces of said pair of opposed clamping members.

9. Ag glare shield device as defined by claim 2 wherein the axis of said cylindrical pivot member is spaced from said broadside surface of said transparent member a distance equal to substantially one half the thickness of the vehicle visor and said pivot member is spaced from the edge of the visor for selective positioning on either side of the visor.

* * * * *